(12) United States Patent
Seo et al.

(10) Patent No.: US 12,253,493 B2
(45) Date of Patent: Mar. 18, 2025

(54) GAS SENSOR WITH INDIRECT PASS-THROUGH VENTILATION

(71) Applicants: Nisshinbo Holdings Inc., Tokyo (JP); JAPAN RADIO CO., LTD., Tokyo (JP); Ueda Japan Radio Co., Ltd., Ueda (JP)

(72) Inventors: Daisuke Seo, Ueda (JP); Yasuhiro Toriyama, Mitaka (JP)

(73) Assignees: Nisshinbo Holdings Inc., Tokyo (JP); Japan Radio Co., Ltd., Tokyo (JP); Ueda Japan Radio Co., Ltd., Ueda (JP)

( * ) Notice: Subject to any disclaimer, the term of this patent is extended or adjusted under 35 U.S.C. 154(b) by 463 days.

(21) Appl. No.: 17/312,794

(22) PCT Filed: Dec. 24, 2019

(86) PCT No.: PCT/JP2019/050506
§ 371 (c)(1),
(2) Date: Jun. 10, 2021

(87) PCT Pub. No.: WO2020/138031
PCT Pub. Date: Jul. 2, 2020

(65) Prior Publication Data
US 2022/0050081 A1    Feb. 17, 2022

(30) Foreign Application Priority Data
Dec. 26, 2018    (JP) .................................. 2018-242868

(51) Int. Cl.
*G01N 29/02*    (2006.01)
*G01N 29/22*    (2006.01)

(52) U.S. Cl.
CPC .......... *G01N 29/02* (2013.01); *G01N 29/222* (2013.01); *G01N 2291/0215* (2013.01); *G01N 2291/101* (2013.01)

(58) Field of Classification Search
CPC ................. G01N 29/02; G01N 29/222; G01N 2291/0215; G01N 2291/101;
(Continued)

(56) References Cited

U.S. PATENT DOCUMENTS

| 5,060,514 A | 10/1991 | Aylsworth |
| 5,313,820 A | 5/1994 | Aylsworth |

(Continued)

FOREIGN PATENT DOCUMENTS

| CN | 1257576 A | 6/2000 |
| CN | 101203750 A | 6/2008 |

(Continued)

OTHER PUBLICATIONS

European Search Report for corresponding European Patent Application No. 19905013.9, mailed Jul. 15, 2022.

(Continued)

*Primary Examiner* — Eric S. McCall
*Assistant Examiner* — Timothy P Graves
(74) *Attorney, Agent, or Firm* — Sheridan Ross P.C.

(57) ABSTRACT

The objective of the present invention is to measure gas concentration with a high degree of accuracy. A gas sensor is provided with: a sensor enclosure: an ultrasonic transducer provided at one end of the sensor enclosure; an ultrasonic wave reflecting surface which is provided at the other end of the sensor enclosure and which intersects an axial direction of the sensor enclosure; and a plurality of ventilation holes provided in a side wall of the sensor enclosure. The plurality of ventilation holes are provided at positions such that one side of the sensor enclosure cannot (Continued)

be seen from the other side thereof when viewed from a side surface side of the sensor enclosure, and each ventilation hole has a shape extending in the axial direction of the sensor enclosure.

12 Claims, 7 Drawing Sheets

(58) Field of Classification Search
CPC ....... G01N 2291/02809; G01N 29/024; G01N 29/32; G01N 29/24; G01N 29/44; Y02A 50/20; Y02E 60/50
See application file for complete search history.

(56) References Cited

U.S. PATENT DOCUMENTS

| | | | |
|---|---|---|---|
| 5,369,979 | A | 12/1994 | Aylsworth et al. |
| 5,452,621 | A | 9/1995 | Aylsworth et al. |
| 6,202,494 | B1 | 3/2001 | Riebel et al. |
| 2003/0136193 | A1 | 7/2003 | Fujimoto |
| 2005/0029101 | A1 | 2/2005 | Isomura et al. |
| 2009/0314058 | A1 | 12/2009 | Cardelius |
| 2010/0281949 | A1 | 11/2010 | Cardelius |
| 2015/0226585 | A1* | 8/2015 | Yang ................. G01D 11/245 73/431 |
| 2020/0158689 | A1 | 5/2020 | Guo |
| 2021/0255024 | A1* | 8/2021 | Ku ................. G01F 23/296 |

FOREIGN PATENT DOCUMENTS

| | | | |
|---|---|---|---|
| CN | 109959429 A | | 7/2019 |
| JP | S53-35586 U | | 3/1978 |
| JP | S58-14051 | | 1/1983 |
| JP | H03-223669 A | | 10/1991 |
| JP | H07-8764 U | | 2/1995 |
| JP | H08-201357 A | | 8/1996 |
| JP | H10-253576 A | | 9/1998 |
| JP | 2001-526787 A | | 12/2001 |
| JP | 2002031621 A | * | 1/2002 |
| JP | 2002-214203 A | | 7/2002 |
| JP | 2002-257801 A | | 9/2002 |
| JP | 2005-037382 A | | 2/2005 |
| JP | 2005-265711 A | | 9/2005 |
| JP | 2006-308401 A | | 11/2006 |
| JP | 2008026067 A | * | 2/2008 |
| JP | 2011-21994 A | | 2/2011 |
| JP | 2011021994 A | * | 2/2011 |
| WO | WO 2006/133738 | | 12/2006 |
| WO | WO 2018/188665 A1 | | 10/2018 |

OTHER PUBLICATIONS

Notification of Reasons for Refusal (Including Translation) for corresponding Japanese Patent Application No. 2018-242868, mailed May 31, 2022.
First Office Action (Including Translation) for corresponding Chinese Patent Application No. 201980085531.6, mailed Mar. 29, 2023.
Decision of Refudal and Decision of Dismissal of Amendment (Including Translation) for corresponding Japanese Patent Application No. 2018-242868, mailed Nov. 1, 2022.
International Preliminary Report on Patentability for International Application No. PCT/JP2019/050506, mailed Jul. 8, 2021.
International Search Report for International Application No. PCT. JP2019/050506, mailed Mar. 17, 2020.
Written Opinion for International Application No. PCT.JP2019/050506, mailed Mar. 17, 2020.
Final Notification of Reasons for Refusal (Including Translation) for corresponding Japanese Patent Application No. 2018-242868, mailed Aug. 23, 2022.
Official Action for Canada Patent Application No. 3,124,672, dated Dec. 16, 2024, 4 pages.
Official Action with English Translation for Korea Patent Application No. 10-2021-7018802, dated Jan. 13, 2025, 8 pages.

* cited by examiner

GAS SENSOR WITH INDIRECT PASS-THROUGH VENTILATION

CROSS REFERENCE TO RELATED APPLICATIONS

This application is a National Phase Application under 35 U.S.C. 371 of PCT Application No. PCT/JP2019/050506 having an international filing date of 24 Dec. 2019 which designated the United States, which PCT application claimed the benefit of Japanese Patent Application No. 2018-242868 filed 26 Dec. 2018, each of which are incorporated herein by reference in their entirety.

TECHNICAL FIELD

The present invention relates to a gas sensor including an ultrasonic transducer, and more particularly to a configuration of a space into which mixture gas such as air containing gas that is a target of concentration measurement or detection flows.

BACKGROUND

Fuel cell vehicles that travel with electric power supplied from a fuel cell have been studied and developed widely. Fuel cells produce electric power through a chemical reaction of hydrogen and oxygen. Typically, hydrogen is supplied to a fuel cell as a fuel, while oxygen is taken from surrounding air into the fuel cell. A fuel cell vehicle includes a hydrogen tank from which hydrogen is supplied to the fuel cell. When the hydrogen tank is short of hydrogen, hydrogen is supplied to the hydrogen tank of a fuel cell vehicle from a hydrogen supply apparatus installed at a hydrogen station.

It is necessary to monitor leakage of hydrogen, which is flammable gas, from fuel cell vehicles and hydrogen supply apparatuses. Hydrogen sensors are therefore widely used along with fuel cell vehicles and hydrogen supply apparatuses. The hydrogen sensors measure the concentration of hydrogen contained in air and issue an alarm in response to the hydrogen concentration exceeding a predetermined value.

For apparatuses in which fluid circulates, such as a radiator or vacuum device of automobiles, abnormality is tested for by detecting leakage of helium while allowing helium to communicate within the apparatuses. Such a test is performed with various types of helium sensors, as helium detectors. Helium sensors, similar to hydrogen sensors, measure the concentration of helium contained in air or detect the concentration of helium exceeding a predetermined value.

The following Patent Documents 1 to 4 disclose apparatuses that measure the concentration of specific gas. The apparatuses disclosed in these patent documents measure the concentration of specific gas based on propagation properties of ultrasound, such as a propagation velocity of ultrasound, in mixture gas such as air to be measured, and may be used for measurement of the concentration of hydrogen and helium, for example.

CITATION LIST

Patent Literature

[PATENT DOCUMENT 1] JP 2002-214203 A
[PATENT DOCUMENT 2] JP H03-223669 A
[PATENT DOCUMENT 3] JP 2002-31621 A
[PATENT DOCUMENT 4] JP 2002-257801 A

SUMMARY

Technical Problem

Apparatuses that measure the concentration of specific gas based on the propagation velocity of ultrasound typically include a space in which the concentration of the gas is measured. This concentration measurement space includes an ultrasonic transducer that transmits and receives ultrasound. The propagation velocity of ultrasound is determined based on a propagation time, which is a time between transmission of ultrasound from a transmitting ultrasonic transducer and reception of ultrasound having propagated within the concentration measurement space by a receiving ultrasonic transducer, and a predetermined propagation distance.

While it is necessary to allow mixture gas such as air to be measured to externally flow into the concentration measurement space, sudden inflow of the air to be measured into the space may significantly change the propagation velocity and propagation direction of ultrasound, causing an error in measurements of the gas concentration.

An object of the present invention is to measure the gas concentration with high accuracy.

Solution to Problem

In one aspect, the present invention includes a cylindrical body; an ultrasonic transducer disposed at a first end of the cylindrical body; an ultrasonic wave reflecting surface disposed at a second end of the cylindrical body and intersecting an axial direction of the cylindrical body; and a plurality of ventilation holes disposed in a peripheral wall of the cylindrical body. The plurality of ventilation holes are disposed at locations where a first side of the cylindrical body is invisible from an opposite second side of the cylindrical body through the plurality of ventilation holes viewed from a peripheral face of the cylindrical body, and each of the ventilation holes has a shape extending in the axial direction of the cylindrical body.

In another aspect, the present invention includes a cylindrical body; an ultrasonic transducer disposed at a first end of the cylindrical body; an ultrasonic wave reflecting surface disposed at a second end of the cylindrical body and intersecting an axial direction of the cylindrical body; and a plurality of ventilation holes disposed in a peripheral wall of the cylindrical body. The plurality of ventilation holes have corresponding through lines each extending in a direction perpendicular to an axial section of the cylindrical body, the through lines of the plurality of ventilation holes pass different locations, and each of the ventilation holes has a shape extending in the axial direction of the cylindrical body.

In another aspect, the present invention includes a cylindrical body; an ultrasonic transducer disposed at a first end of the cylindrical body; an ultrasonic wave reflecting surface disposed at a second end of the cylindrical body, the ultrasonic wave reflecting surface intersecting an axial direction of the cylindrical body; a plurality of ventilation holes disposed in a peripheral wall of the cylindrical body; and a rib structure disposed on a peripheral face of the cylindrical body and protruding outward of the cylindrical body. The ventilation holes each have an opening located in a region between a plurality of linear protrusions of the rib structure, and the plurality of ventilation holes are disposed at locations where a first side of the cylindrical body is invisible from an opposite second side of the cylindrical body through the plurality of ventilation holes viewed from the peripheral face of the cylindrical body.

In another aspect, the present invention includes a cylindrical body; an ultrasonic transducer disposed at a first end of the cylindrical body; an ultrasonic wave reflecting surface disposed at a second end of the cylindrical body and intersecting an axial direction of the cylindrical body; a plurality of ventilation holes disposed in a peripheral wall of the cylindrical body; and a rib structure disposed on a peripheral face of the cylindrical body and protruding outward of the cylindrical body. The ventilation holes each have an opening located in a region between a plurality of linear protrusions of the rib structure, and the plurality of ventilation holes have corresponding through lines each extending in a direction perpendicular to an axial section of the cylindrical body and the through lines of the plurality of ventilation holes pass different locations.

Preferably, the ventilation holes may each have a shape extending in the axial direction of the cylindrical body, and the rib structure may include a plurality of circumferential protrusions each surrounding a periphery of the cylindrical body, and the opening of each of the ventilation holes may be located in a region between adjacent circumferential protrusions of the plurality of circumferential protrusions.

Preferably, the rib structure may have a lattice shape and be disposed on the peripheral face of the cylindrical body.

Advantageous Effects of Invention

The present invention enables highly accurate measurements of the gas concentration.

DESCRIPTION OF EMBODIMENTS

Each embodiment of the present invention will be described with reference to the drawings. Similar elements are designated with similar numerical references throughout a plurality of drawings. The terms used herein to refer to geometric shapes such as a cylindrical shape and a column shape may also refer to modified versions of the original geometric shapes modified to emphasize the function and aesthetic appearance of members.

Figure 1:
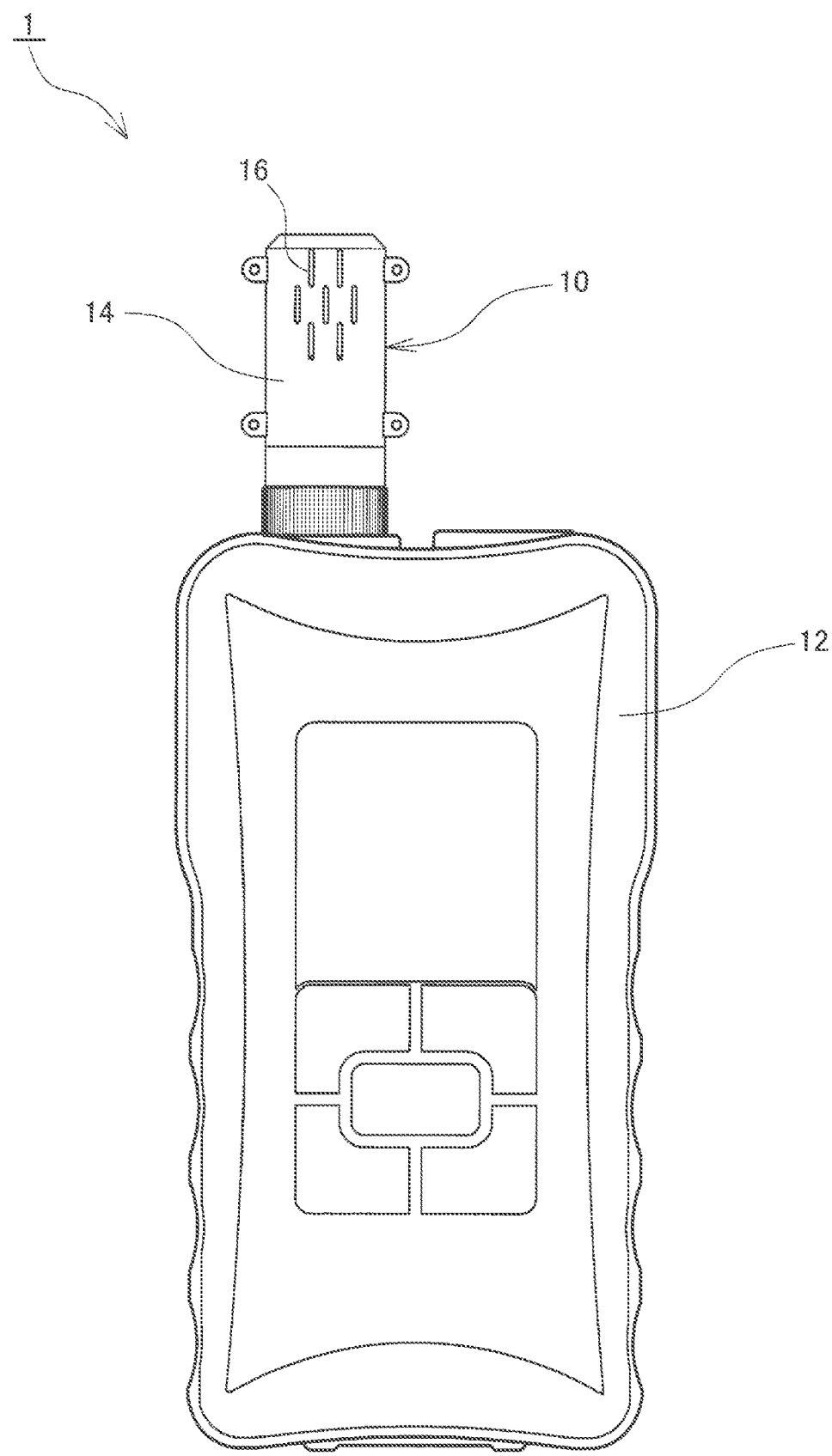
FIG. 1 illustrates a gas concentration measurement apparatus.

FIG. 1 illustrates a gas concentration measurement apparatus 1 according to a first embodiment of the present invention. The gas concentration measurement apparatus 1 includes a gas sensor 10 and a body 12. The gas sensor 10 includes a sensor enclosure 14 containing an ultrasonic transducer. The sensor enclosure 14 has a hollow cylindrical shape, that is, a column shape with a closed top. The sensor enclosure 14 includes, on its peripheral wall, ventilation holes 16 through which mixture gas such as air is allowed to flow into the sensor enclosure 14. Under the control of the body 12, ultrasound is transmitted from the ultrasonic transducer to the interior of the sensor enclosure 14, and the ultrasound reflected within the sensor enclosure 14 is received by the ultrasonic transducer. The body 12 determines, based on the time when the ultrasonic transducer transmits ultrasound and the time when the ultrasonic transducer receives the ultrasound, a propagation time corresponding to a round-trip propagation time of ultrasound within the sensor enclosure 14, and determines, based on the propagation time, the concentration of target gas.

Figure 2:
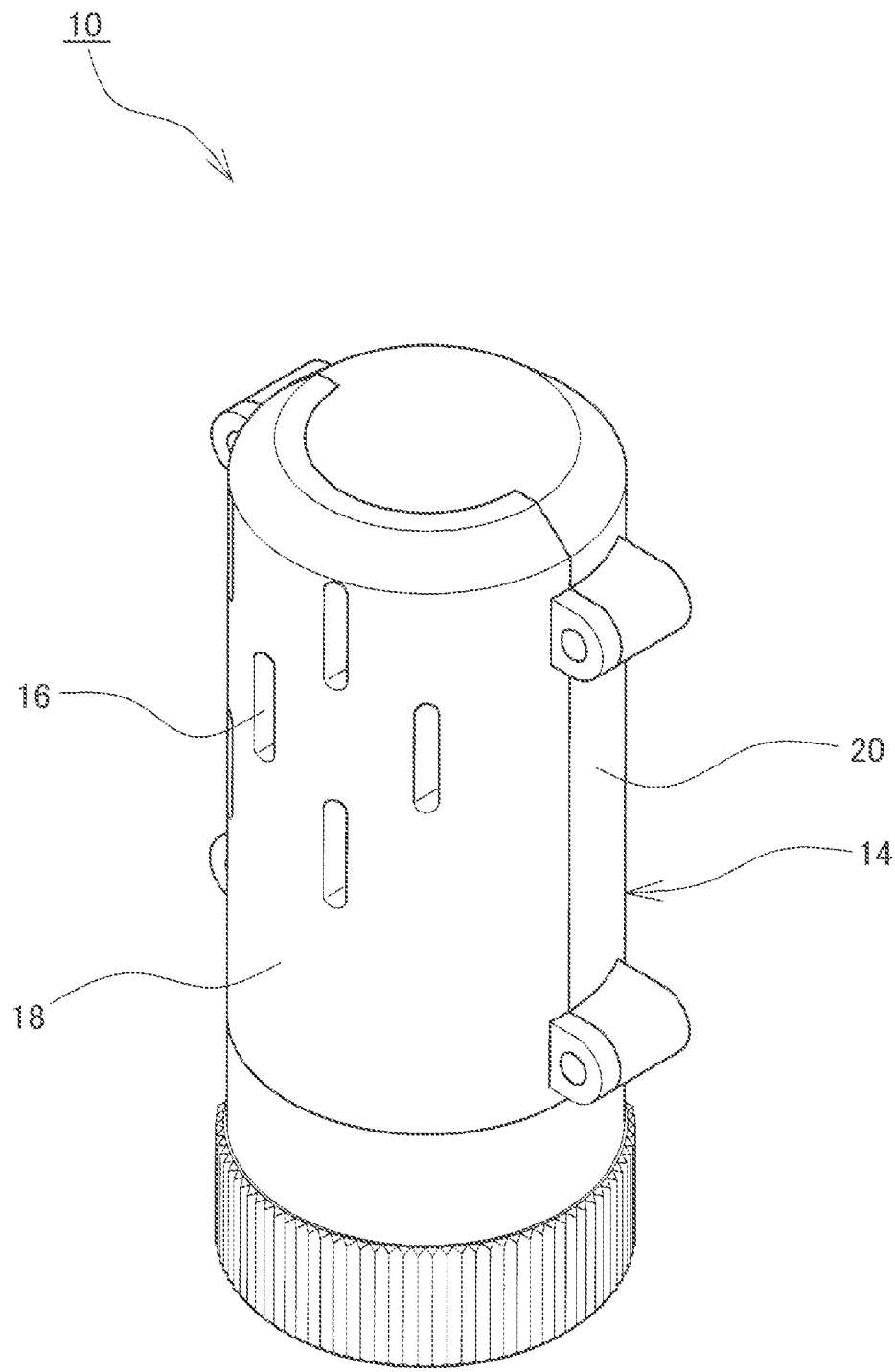
FIG. 2 is a perspective view of a gas sensor.

FIG. 2 is a perspective view of the gas sensor 10. The sensor enclosure 14 includes a front enclosure 18 and a rear enclosure 20. The front enclosure 18 has an arch shaped upper part, corresponding to three-quarters of a front face of the sensor enclosure 14. A rear face of the front enclosure 18 and a front face of the rear enclosure 20 are engaged with each other to form the sensor enclosure 14. The front enclosure 18 and the rear enclosure 20 include a plurality of ventilation holes 16 for communication between the inside and the outside of the sensor enclosure 14. Each ventilation hole 16 extends along the axis of the cylindrical shape of the sensor enclosure 14. Thus, each ventilation hole 16 has a vertical length that is longer than a lateral length (width).

Figure 3A:
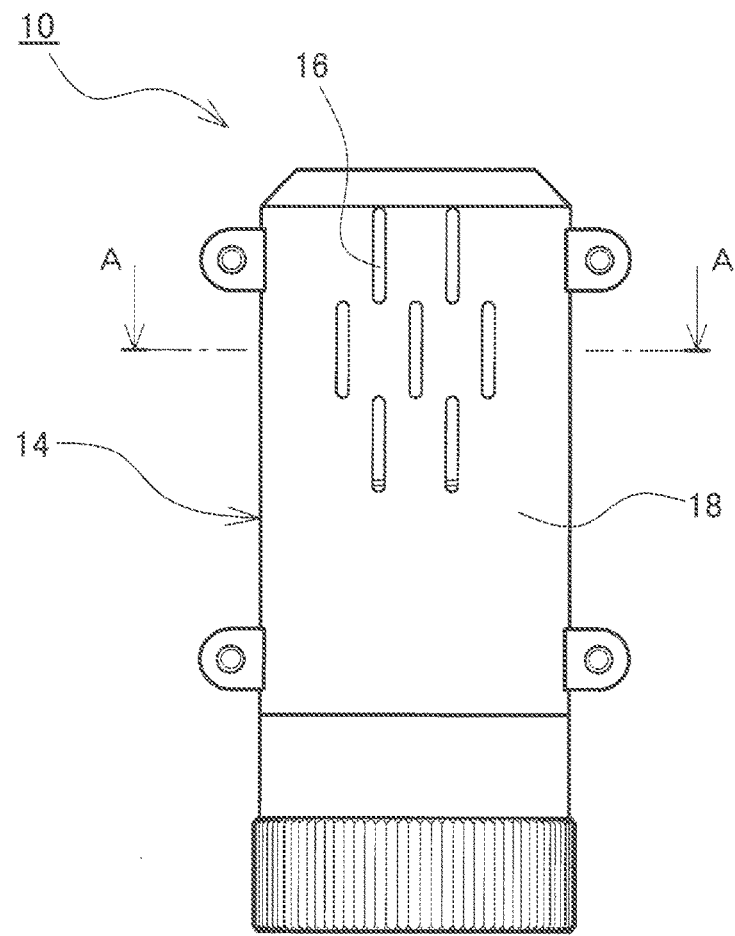
FIG. 3A is a front view of the gas sensor.
Figure 3B:
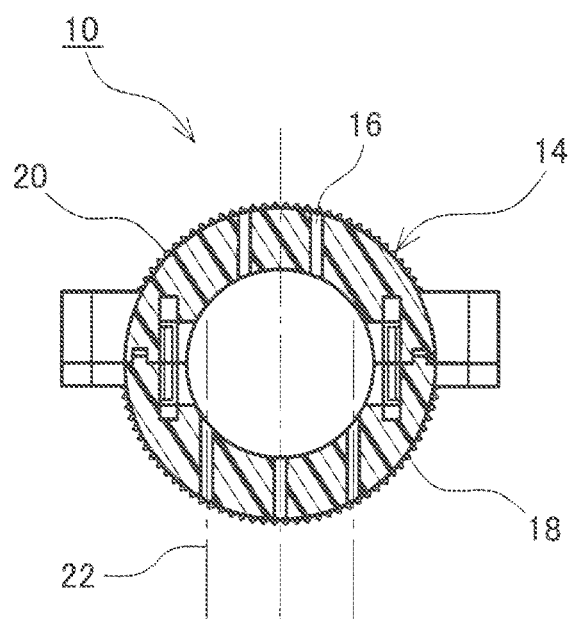
FIG. 3B illustrates a cross section of the gas sensor along a direction perpendicular to the axial direction.

FIG. 3A is a front view of the gas sensor 10, and FIG. 3B is a cross section (a cross section perpendicular to the axial direction) taken along AA line in FIG. 3A. As illustrated in FIG. 3A, the gas sensor 10 includes, on its front face, seven ventilation holes 16 arranged in three rows: two ventilation holes 16 arranged laterally in an upper row; three ventilation holes 16 arranged laterally in a middle row; and two ventilation holes 16 arranged laterally in a lower row. The ventilation hole 16 on the left in the upper row is disposed above a space between the ventilation hole 16 on the left in the middle row and the ventilation hole 16 at the center in the middle row, and the ventilation hole 16 on the right in the upper row is disposed above a space between the ventilation hole 16 on the right in the middle row and the ventilation hole 16 at the center in the middle row. The ventilation hole 16 on the left in the lower row is disposed below a space between the ventilation hole 16 on the left in the middle row and the ventilation hole 16 at the center in the middle row, and the ventilation hole 16 on the right in the lower row is disposed below a space between the ventilation hole 16 on the right in the middle row and the ventilation hole 16 at the center in the middle row.

Figure 4:
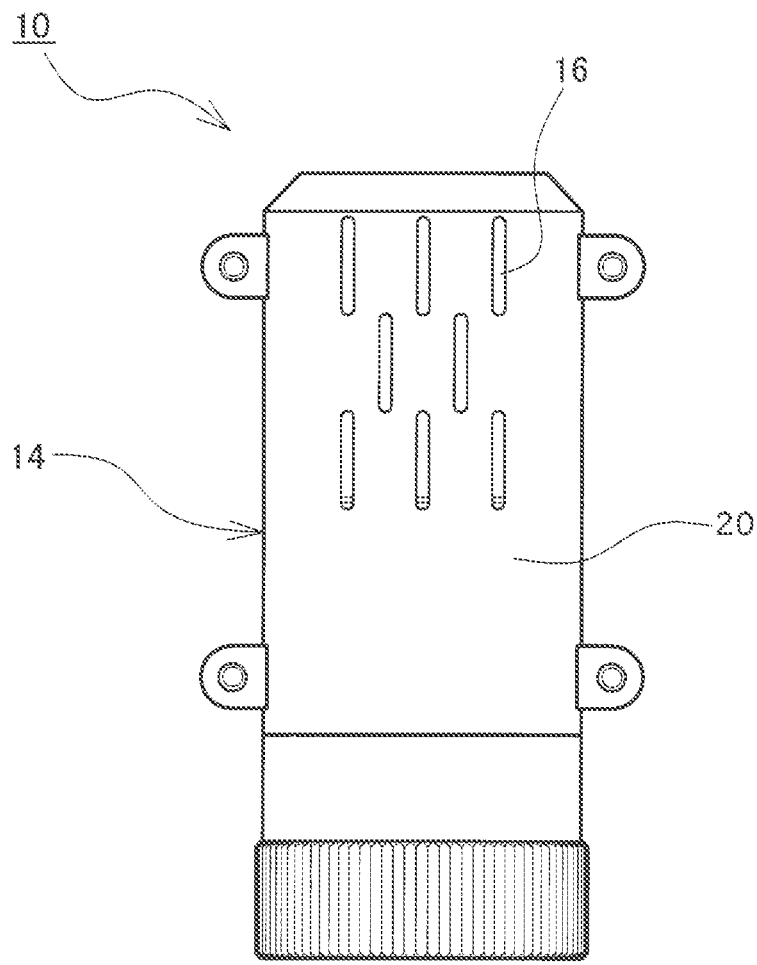
FIG. 4 illustrates a rear view of the gas sensor.

FIG. 4 is a rear view of the gas sensor 10. The gas sensor 10 includes, on its rear face, eight ventilation holes 16 arranged in three rows: three ventilation holes 16 arranged laterally in an upper row; two ventilation holes 16 laterally arranged in a middle row; and three ventilation holes 16 laterally arranged in a lower row. The ventilation hole 16 on the left in the middle row is disposed below a space between the ventilation hole 16 on the left in the upper row and the ventilation hole 16 at the center in the upper row, that is, above a space between the ventilation hole 16 on the left in the lower row and the ventilation hole 16 at the center in the lower row. The ventilation hole 16 on the right in the middle row is disposed below a space between the ventilation hole 16 on the right in the upper row and the ventilation hole 16 at the center in the upper row. that is, above a space between the ventilation hole 16 on the right in the lower row and the ventilation hole 16 at the center in the lower row. The ventilation holes 16 on the left and right and at the center in the upper row are disposed above the ventilation holes 16 on the left and right and at the center in the lower row, respectively, via a region where the ventilation holes 16 in the middle row are arranged.

Referring back to FIG. 3B, the positional relationship between the ventilation holes 16 disposed on the front enclosure 18 and the ventilation holes 16 disposed on the rear enclosure 20 will be described. Each ventilation hole 16 extends in the front-rear direction through the peripheral wall of the sensor enclosure 14. FIG. 3B shows, with dashed and double-dotted lines, through lines 22 extending through the ventilation holes 16 and perpendicular to the axial section of the sensor enclosure 14, which is a plane parallel to the front and rear faces. The through line 22 is a straight line extending in the same direction as the through direction of the ventilation hole 16. The through lines 22 extending from the respective ventilation holes 16 pass through different locations. Therefore, the ventilation holes 16 disposed on the front enclosure 18 and the ventilation holes 16 disposed on the rear enclosure 20 do not exist on the same through lines 22.

Figure 5:
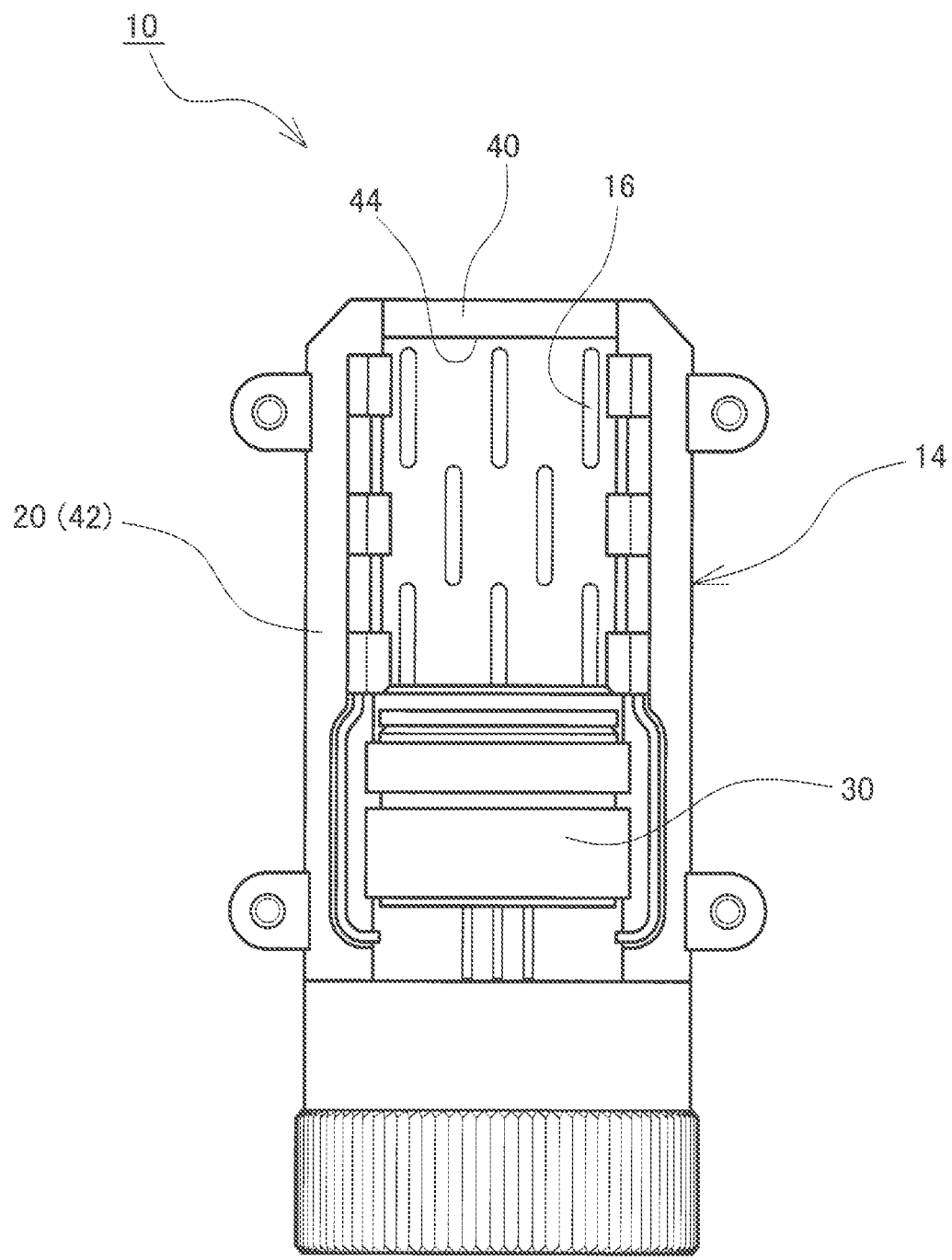
FIG. 5 is a front view of the gas sensor with a front casing being removed.

FIG. 5 illustrates a front view of the gas sensor 10 with the front enclosure 18 being removed. The gas sensor 10 includes an ultrasonic transducer 30 in a region below a region where the ventilation holes 16 are disposed in the rear enclosure 20. The rear enclosure 20 includes, at its upper end, a top board 40 having a board face perpendicular to the axial direction of the sensor enclosure 14. The front enclosure 18 is fitted to the rear enclosure 20 from the front, to thereby form the sensor enclosure 14.

The sensor enclosure 14 formed from the front enclosure 18 and the rear enclosure 20 includes a cylindrical body 42, as a cylindrical member, having an upper end closed with the top board 40. The ultrasonic transducer 30 is disposed toward the lower end of the cylindrical body 42, and an ultrasound propagation path along which ultrasound propagates is formed between the ultrasonic transducer 30 and the top board 40. The sensor enclosure 14 further includes a plurality of ventilation holes 16 on the peripheral wall of the cylindrical body 42.

The ratio of the area of openings of all the ventilation holes 16 with respect to the area of the peripheral face of the sensor enclosure 14 may be 6% or greater and 20% or less, and preferably 8% or greater and 15% or less. A belt-shaped ventilation region surrounding the peripheral face of the sensor enclosure 14, where the ventilation holes 16 are disposed, may have an area which is 25% of the area of the peripheral face of the sensor enclosure 14. The number of ventilation holes 16 in the ventilation region may be, for example, one or more and six or less per 1 cm$^2$, and preferably two or more and five or less per 1 cm$^2$.

Assuming that FIG. 5 is an axial cross section of the gas sensor 10, operation of the gas sensor 10 will be described. The ventilation holes 16 disposed in the sensor enclosure 14 ventilate the internal space of the sensor enclosure 14 serving as a concentration measurement space. Specifically, the air outside the sensor enclosure 14 flows through the ventilation holes 16 disposed in the sensor enclosure 14 into the sensor enclosure 14. The air inside the sensor enclosure 14 flows through the ventilation holes 16 disposed in the sensor enclosure 14 out of the sensor enclosure 14. To facilitate ventilation of the air, a user may move the gas concentration measurement apparatus 1 (see FIG. 1) in the air.

The ultrasonic transducer 30 transmits ultrasound based on a transmitting signal output from a controller included in the body 12 illustrated in FIG. 1. The ultrasound transmitted from the ultrasonic transducer 30 propagates along the ultrasound propagation path formed by the cylindrical body 42 and is reflected by a lower face (an ultrasonic wave reflecting surface 44 intersecting the axial direction of the cylindrical body 42) of the top board 40. The ultrasound reflected by the ultrasonic wave reflecting surface 44 propagates along the ultrasound propagation path toward the ultrasonic transducer 30, and is then received by the ultrasonic transducer 30. The ultrasonic transducer 30 converts the reflected ultrasound to a received signal and outputs the received signal to the controller. The controller determines, based on a time when the controller outputs the transmitting signal and a time when the ultrasonic transducer 30 outputs the received signal, a round-trip propagation time which the ultrasound takes to propagate between the ultrasonic transducer 30 and the ultrasonic wave reflecting surface 44. The controller further determines a propagation velocity of the ultrasound along the ultrasound propagation path based on the distance between the ultrasonic transducer 30 and the ultrasonic wave reflecting surface 44 and the round-trip propagation time, and then further determines the concentration of target gas to be measured based on the propagation velocity.

As illustrated in FIG. 3B, in the gas sensor 10 of this embodiment, each ventilation hole 16 extends in the front-rear direction through the peripheral wall of the sensor enclosure 14. The ventilation holes 16 disposed in the front enclosure 18 and the ventilation holes 16 disposed in the rear enclosure 20 do not exist on common through lines 22. The flow of air flowing into the gas sensor 10 through the ventilation holes 16 disposed in the front enclosure 18 and attempting to flow out through the ventilation holes 16 disposed in the rear enclosure 20 is therefore blocked by a region of the rear enclosure 20 where the ventilation holes 16 are not disposed. Similarly, the flow of air flowing into the gas sensor 10 through the ventilation holes 16 disposed in the rear enclosure 20 and attempting to flow out through the ventilation holes 16 disposed in the front enclosure 18 is blocked by a region of the front enclosure 18 where the ventilation holes 16 are not disposed. This configuration maintains ventilation of the interior of the sensor enclosure 14 and simultaneously prevents rapid inflow of the air to be measured into the sensor enclosure 14, thereby reducing a change in the propagation velocity and propagation direction of ultrasound within the sensor enclosure 14. This prevents an error in the time in which the ultrasound makes a round-trip within the concentration measurement space, thereby reducing an error in gas concentration measurement. Further, the ventilation holes 16 extending along the axial direction of the cylindrical shape of the sensor enclosure 14 facilitate ventilation of the interior of the sensor enclosure 14 which is axially elongated.

The ventilation holes 16 need not extend perpendicularly to the axial cross section, or the through lines 22 need not extend from the corresponding ventilation holes 16 toward the same direction. In other words, the depth direction of each ventilation hole 16 need not be normal to the axial cross section, or the through lines 22 need not extend in the same direction from the ventilation holes 16. For example, each ventilation hole 16 may extend in a direction perpendicular to the peripheral face of the sensor enclosure 14.

The ventilation hole 16 in the rear enclosure 20 may be disposed at locations out of the line of sight directed from the ventilation holes 16 in the front enclosure 18 toward the rear face. Similarly, the ventilation holes 16 in the front enclosure 18 may be disposed at locations out of the line of sight directed from the ventilation holes 16 in the rear enclosure 20 toward the front face. In other words, the plurality of ventilation holes 16 may be disposed such that a first side of the sensor enclosure 14 is not visible from an opposite second side of the sensor enclosure 14 through the ventilation holes 16 viewed from the peripheral wall.

Experimental results for the gas sensor 10 will be described. In an experiment in which the ventilation holes 16 had the same shape as those illustrated in FIGS. 2, 3A, and 3B, the aperture ratio of a single ventilation hole 16 was in the range from 0.68% to 0.78%, the aperture ratio of all ventilation holes 16 was 10.9%, and the number of ventilation holes 16 per 1 $cm^2$ was 1.3, a detection time was 4.5 seconds, and an exhaust time was 19 seconds. Here, the detection time refers to a time between when the gas sensor 10 was placed in air containing 5% of helium and when 90% of the convergence value of concentration measurements was reached. The exhaust time refers to a time starting from a state where the gas sensor 10 was placed in air containing 5% of helium and the concentration measurement corresponded to the convergence value to when the gas sensor 10 was placed in air containing no helium and the concentration measurement was 0. Further, in an experiment in which the aperture ratio of a single ventilation hole 16 was in the range from 0.55% to 0.62%, the aperture ratio of all ventilation holes 16 was 8.8%, and the number of ventilation holes 16 per 1 $cm^2$ was 1.3, the detection time was 7 seconds and the exhaust time was 27 seconds.

Figure 6:
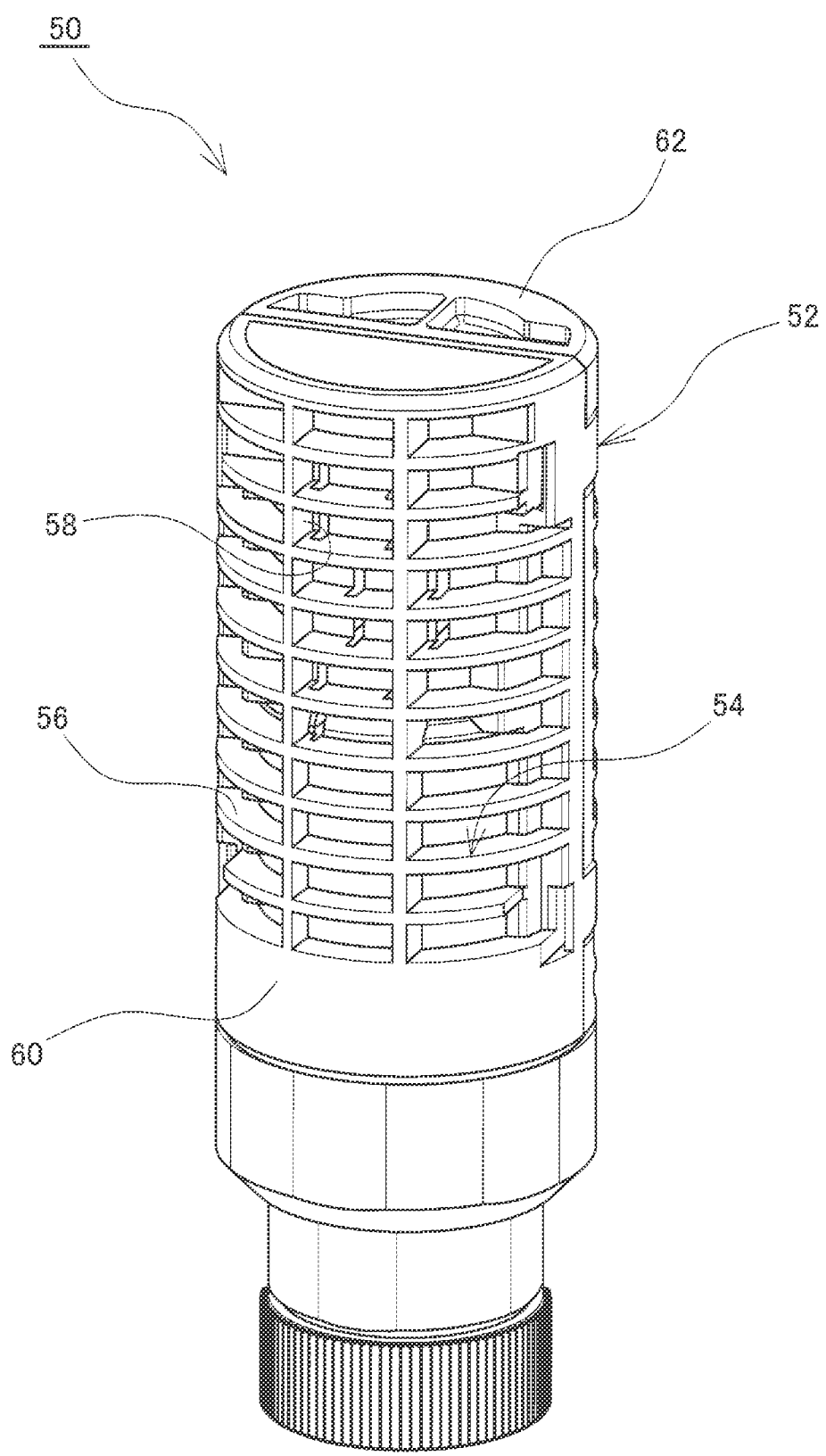
FIG. 6 is a perspective view of a gas sensor.
Figure 7A:
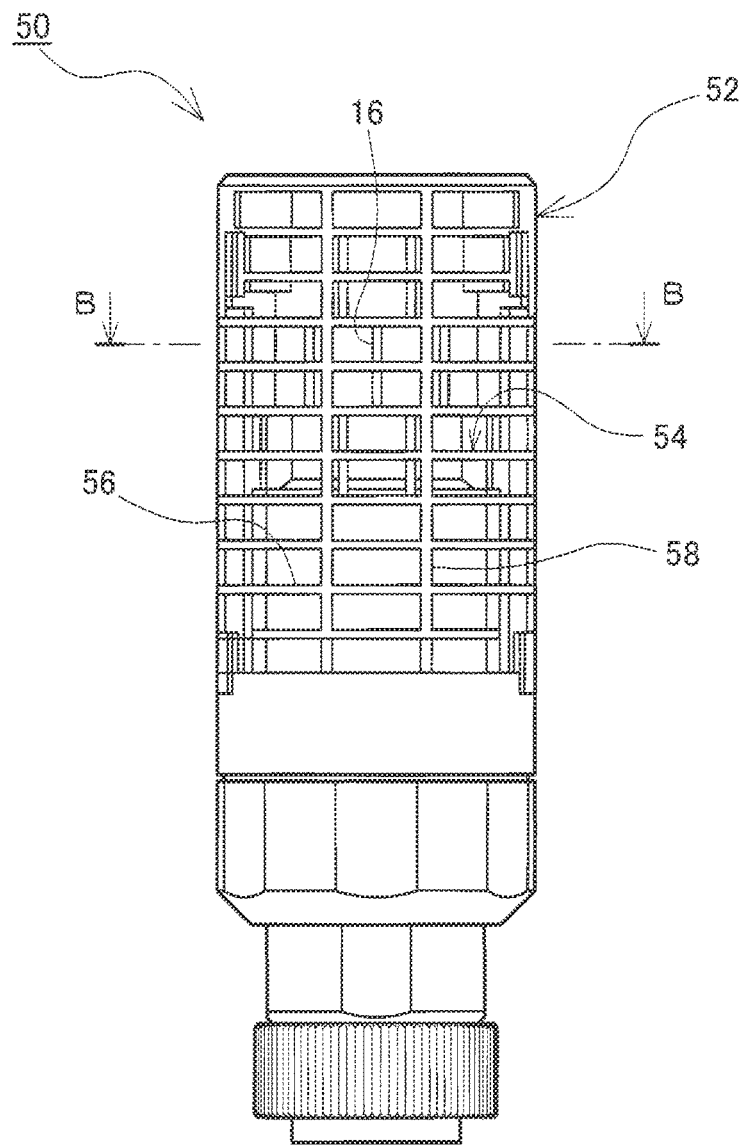
FIG. 7A is a front view of a gas sensor.
Figure 7B:
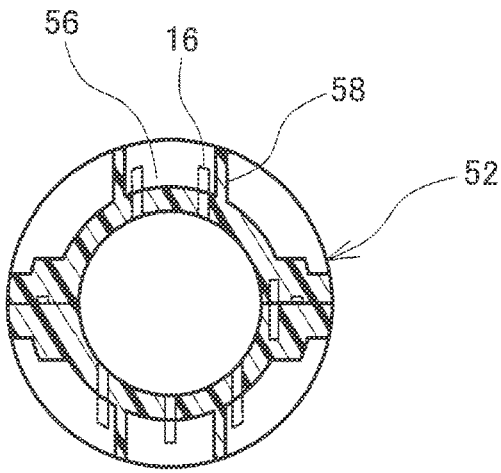
FIG. 7B is a cross section of a gas sensor along a direction perpendicular to the axial direction.

FIG. 6 illustrates a perspective view of a gas sensor 50 according to a second embodiment of the present invention. FIG. 7A illustrates a front view of the gas sensor 50, and FIG. 7B illustrates a cross section along a line BB in FIG. 7A. The gas sensor 50 includes a lattice-shape rib structure 54 on a peripheral face of a sensor enclosure 52. The rib structure 54 includes circumferential protrusions 56 surrounding the sensor enclosure 52 and vertical protrusions 58 which are linear protrusions extending vertically, and has a lattice shape. A plurality of circumferential protrusions 56 are formed on the peripheral face of the sensor enclosure 52 at predetermined intervals, and adjacent circumferential protrusions 56 are coupled by a plurality of vertical protrusions 58 arranged in the circumferential direction at predetermined intervals. The plurality of vertical protrusions 58 are arranged vertically in straight lines and disposed at predetermined intervals in the circumferential direction. As illustrated in FIG. 7B, the vertical protrusions 58 protrude from the peripheral face of the sensor enclosure 52 in the same direction as the through direction of the ventilation holes 16. The openings of the ventilation holes 16 are located in a region enclosed by adjacent circumferential protrusions 56 and adjacent vertical protrusions 58. The circumferential protrusions 56 and the vertical protrusions 58 may traverse the openings of the ventilation holes 16.

The lattice-shape rib structure 54 disposed on the peripheral face of the sensor enclosure 52 provides the following advantages. Specifically, the air attempting to flow into the sensor enclosure 52 from diagonally upward or diagonally downward is directed by the circumferential protrusions 56 in a direction perpendicular to the periphery of the sensor enclosure 52. This reduces the flow of air flowing into the sensor enclosure 52 from diagonally upward or downward through the ventilation holes 16 disposed in the front enclosure 60 and flowing out through the ventilation holes 16 disposed downward or upward in the rear enclosure 62. This configuration similarly reduces the flow of air flowing into the sensor enclosure 52 diagonally upward or downward through the ventilation holes 16 disposed in the rear enclosure 62 and flowing out through the ventilation holes 16 disposed downward or upward in the front enclosure 60. Thus, the circumferential protrusions 56 reduce passage of the diagonally upward or downward air with respect to the sensor enclosure 52 through the sensor enclosure 52.

The air to flow into the sensor enclosure 52 from the right or left of the ventilation hole 16 is directed by the vertical protrusion 58 in a direction perpendicular to the peripheral face of the sensor enclosure 52. This prevents the flow of air flowing into the ventilation holes 16 disposed on the front enclosure 60 from diagonally forward right or left and flowing out of the ventilation holes 16 on the left or right disposed in the rear enclosure 62. This configuration similarly prevents the flow of air flowing into the ventilation holes 16 disposed on the rear enclosure 62 from diagonally rearward right or left and flowing out of the ventilation holes 16 on the left or right disposed in the front enclosure 60. The vertical protrusions 58 thus reduce passage of the air in the diagonally right and left directions with respect to the front face or the rear face of the sensor enclosure 52.

The rib structure 54 formed on the peripheral face of the sensor enclosure 52 prevents rapid flow of the mixture gas such as air to be measured into the sensor enclosure 52 to reduce a change of the propagation velocity of ultrasound within the sensor enclosure 52. More specifically, the circumferential protrusions 56 prevent the flow of air passing through the ventilation holes 16 having an axial length greater than its lateral width, diagonally upward or downward. The vertical protrusions 58 prevent the flow of air passing through the ventilation holes 16 having a lateral width greater than its axial length, from diagonally forward left or rearward right, or from diagonally rearward left or forward right. This results in a reduction in an error of time during which the ultrasound propagates the concentration measurement space to thereby reduce an error in the gas concentration measurements. The rib structure 54 formed on the peripheral face of the sensor enclosure 52 further enhances the mechanical strength of the sensor enclosure 52.

While in the above embodiments the sensor enclosure (14, 52) has a hollow cylindrical shape, the sensor enclosure (14, 52) may have a shape of a hollow polygonal cylinder or a hollow elliptical cylinder, for example. In the above embodiments, the ventilation hole 16 has a shape extending along the axis of the sensor enclosure (14, 52), but the ventilation hole 16 may have a shape of a perfect circle, an ellipse, or a rectangle, for example. Further, the cylindrical body may include, on its inner peripheral face corresponding to the peripheral face, a gas-liquid separation membrane formed of a hollow fiber membrane such as PTFE, PP, PE, silicone resin, for example, attached to the inner peripheral face, to thereby prevent entrance of water droplets and dust into the gas concentration measurement space within the cylindrical body.

REFERENCE SIGNS LIST 1 gas concentration measurement apparatus, 10, 50 gas sensor, 14, 52 sensor enclosure, 16 ventilation hole, 18, 60 front enclosure, 20, 62 rear enclosure, 22 through line, 30 ultrasonic transducer, 40 top board, 42 cylindrical body, 44 ultrasonic wave reflecting surface, 54 rib structure, 56 circumferential protrusion, 58 vertical protrusion.

The invention claimed is:
1. A gas sensor comprising:
a cylindrical body;
an ultrasonic transducer disposed at a first end of the cylindrical body;

an ultrasonic wave reflecting surface disposed at a second end of the cylindrical body, the ultrasonic wave reflecting surface intersecting an axial direction of the cylindrical body; and a plurality of ventilation holes disposed in a peripheral wall of the cylindrical body, wherein:

the plurality of ventilation holes have corresponding through lines each extending in a direction perpendicular to an axial section of the cylindrical body, the through lines extending directly and in a straight line from the respective ventilation hole to an opposite side of the cylindrical body, the plurality of ventilation holes have ventilation holes on a first side of the cylindrical body that are not visible when viewed along respective through lines from ventilation holes on an opposite second side of the cylindrical body, the first side of the cylindrical body is visible when viewed along respective through lines from the ventilation holes on the opposite second side of the cylindrical body, each of the ventilation holes has a shape extending in the axial direction of the cylindrical body, and the plurality of ventilation holes includes three or more ventilation holes distributed on the cylindrical body.

2. A gas sensor comprising:

a cylindrical body;

an ultrasonic transducer disposed at a first end of the cylindrical body;

an ultrasonic wave reflecting surface disposed at a second end of the cylindrical body, the ultrasonic wave reflecting surface intersecting an axial direction of the cylindrical body;

a plurality of ventilation holes disposed in a peripheral wall of the cylindrical body; and a rib structure disposed on a peripheral face of the cylindrical body, the rib structure protruding outward of the cylindrical body, wherein:

the ventilation holes each have an opening located in a region between a plurality of linear protrusions of the rib structure, and the plurality of ventilation holes are disposed at locations where ventilation holes on a first side of the cylindrical body are invisible from ventilation holes on an opposite second side of the cylindrical body when viewed through the ventilation holes on the opposite second side of the cylindrical body from the peripheral face of the cylindrical body, and the first side of the cylindrical body is visible from the ventilation holes on the opposite second side of the cylindrical body when viewed through the ventilation holes on the opposite second side of the cylindrical body from the peripheral face of the cylindrical body.

3. The gas sensor according to claim 2, wherein the ventilation holes each have a shape extending in the axial direction of the cylindrical body, and the rib structure includes a plurality of circumferential protrusions each surrounding a periphery of the cylindrical body, and the opening of each of the ventilation holes is located in a region between adjacent circumferential protrusions of the plurality of circumferential protrusions.

4. The gas sensor according to claim 2, wherein the rib structure has a lattice shape and is disposed on the peripheral face of the cylindrical body.

5. The gas sensor of claim 2, wherein the cylindrical body is hollow.

6. The gas sensor of claim 2, wherein the cylindrical body is hollow between the plurality of ventilation holes.

7. The gas sensor of claim 2, wherein the plurality of ventilation holes are staggered in a horizontal and vertical position on the cylindrical body.

8. The gas sensor of claim 2, wherein a ratio of an area of openings of all the plurality of ventilation holes with respect to an area of the peripheral face of the cylindrical body is between 6% and 20%.

9. The gas sensor of claim 2, further comprising a gas-liquid separation membrane that prevents one or more of a liquid and dust within the cylindrical body.

10. A gas sensor comprising:

a cylindrical body;

an ultrasonic transducer disposed at a first end of the cylindrical body;

an ultrasonic wave reflecting surface disposed at a second end of the cylindrical body, the ultrasonic wave reflecting surface intersecting an axial direction of the cylindrical body;

a plurality of ventilation holes disposed in a peripheral wall of the cylindrical body; and a rib structure disposed on a peripheral face of the cylindrical body, the rib structure protruding outward of the cylindrical body, wherein:

the ventilation holes each have an opening located in a valley region between a plurality of linear protrusions of the rib structure, the plurality of ventilation holes have corresponding through lines each extending in a direction perpendicular to an axial section of the cylindrical body, the through lines extending directly and in a straight line from the respective ventilation hole to an opposite side of the cylindrical body, the plurality of ventilation holes have ventilation holes on a first side of the cylindrical body that are not visible when viewed along respective through lines from ventilation holes on an opposite second side of the cylindrical body, and the first side of the cylindrical body is visible when viewed along respective through lines from the ventilation holes on the opposite second side of the cylindrical body.

11. The gas sensor according to claim 10, wherein the ventilation holes each have a shape extending in the axial direction of the cylindrical body, and the rib structure includes a plurality of circumferential protrusions each surrounding a periphery of the cylindrical body, and the opening of each of the ventilation holes is located in a region between adjacent circumferential protrusions of the plurality of circumferential protrusions.

12. The gas sensor according to claim 10, wherein the rib structure has a lattice shape and is disposed on the peripheral face of the cylindrical body.

* * * * *